US007708897B2

(12) United States Patent
Joussot-Dubien et al.

(10) Patent No.: US 7,708,897 B2
(45) Date of Patent: May 4, 2010

(54) DEVICE AND INSTALLATION FOR INJECTING PARTICULATE MATTER INTO AN ENCLOSURE AND ASSOCIATED METHOD

(75) Inventors: Christophe Joussot-Dubien, Rochefort du Gard (FR); Hubert-Alexandre Turc, Les Angles (FR)

(73) Assignee: Commissariat A l'Energie Atomique (FR)

( * ) Notice: Subject to any disclaimer, the term of this patent is extended or adjusted under 35 U.S.C. 154(b) by 473 days.

(21) Appl. No.: 11/660,420

(22) PCT Filed: Aug. 16, 2005

(86) PCT No.: PCT/FR2005/050673

§ 371 (c)(1),
(2), (4) Date: Feb. 16, 2007

(87) PCT Pub. No.: WO2006/024806

PCT Pub. Date: Mar. 9, 2006

(65) Prior Publication Data

US 2007/0201304 A1 Aug. 30, 2007

(30) Foreign Application Priority Data

Aug. 25, 2004 (FR) .................................. 04 51902

(51) Int. Cl.
*C02F 1/68* (2006.01)
*B01J 19/00* (2006.01)

(52) U.S. Cl. ...................... 210/761; 422/189; 422/190; 422/232; 422/241; 422/242; 210/198.1; 210/199; 210/205

(58) Field of Classification Search ................ 422/190, 422/189, 232, 241, 242; 210/758, 761, 198.1, 210/199, 205
See application file for complete search history.

(56) References Cited

U.S. PATENT DOCUMENTS

| | | | | |
|---|---|---|---|---|
| 5,804,066 | A * | 9/1998 | Mueggenburg et al. | 210/177 |
| 6,475,396 | B1 * | 11/2002 | Wofford et al. | 210/758 |
| 6,749,816 | B1 * | 6/2004 | Hasegawa et al. | 422/189 |
| 6,958,122 | B1 * | 10/2005 | Gidner et al. | 210/761 |
| 7,531,148 | B2 * | 5/2009 | Cornay et al. | 422/209 |
| 2005/0283010 | A1 * | 12/2005 | Chordia et al. | 554/11 |

FOREIGN PATENT DOCUMENTS

| | | | |
|---|---|---|---|
| DE | 1 056 591 | | 6/1958 |
| JP | 200254479 | * | 9/2000 |

OTHER PUBLICATIONS

French Preliminary Search Report dated Apr. 4, 2005, citing the above reference.

* cited by examiner

*Primary Examiner*—N. Bhat
(74) *Attorney, Agent, or Firm*—Baker & Hostetler, LLP

(57) ABSTRACT

Device, system and method for injecting organic matter into a reaction enclosure (2) of a reactor for treatment using a supercritical water oxidation method. The device comprises a body having an inner volume defining a pressurizing capacity (24) in which a mobile assembly (29) is arranged, e.g. a bellows for dividing the inner volume into two variable volume compartments including a compressing capacity compartment (32) and a hydraulic pressurizing capacity compartment (34). The hydraulic pressurizing capacity compartment is preferably connected to the outlet (15) of an aqueous phase liquid/gas separator (14) which separates the liquid and gaseous phases of the effluent leaving the reaction enclosure (2).

21 Claims, 1 Drawing Sheet

DEVICE AND INSTALLATION FOR INJECTING PARTICULATE MATTER INTO AN ENCLOSURE AND ASSOCIATED METHOD

CROSS-REFERENCES TO RELATED APPLICATIONS

This application is filed under 35 C.F.R. 371 from PCT/FR05/050673 filed on Aug. 16, 2005.

TECHNICAL AREA

The invention concerns a device for injecting matter into a reaction enclosure in a pressurized water treatment process.

It also concerns an installation for treating matter, comprising a reaction enclosure having an inlet for the matter to be treated, an inlet for an oxidizing gas mixture e.g. air, compressed to operating pressure, an outlet for a liquid/gas effluent and a device for injecting matter connected to the inlet for the matter to be treated.

Finally, it concerns a method for treating matter in an installation according to the invention.

In the area of pressurized methods for treating waste, two major families of methods can be identified which use water as reaction medium: the Wet Air Oxidation method (WAO) and hydrothermal oxidation or Supercritical Water Oxidation (SCWO). WAO is characterized by temperature and pressure conditions below the critical conditions for water. On this account it operates under diphase conditions obtaining mineralization rates of one and even two orders of magnitude higher than with SCWO.

Supercritical water oxidation methods (SCWO) in supercritical water use the particular properties of water at pressure and temperature conditions higher than 221 bar and 374° C., and in particular its low dielectric constant allowing solubilisation of hydrophobic compounds, its low density and viscosity allowing mixing with gaseous compounds in all proportions. The reaction medium obtained enables thorough, homogenous mixing between the organic compounds and oxygen acting as fuel and oxidant in the mineralization reaction, which can then be triggered spontaneously due to the temperature of the medium. Gases such as $O_2$, $CO_2$, $N_2$ are fully soluble in water as are numerous alkanes. These combustions can then take place without the inter-phase transfer limitation generally observed at low temperatures or at low pressures, as in incinerators or wet air oxidation methods, achieving total mineralization of the organic matrix within residence times of less than one minute. SCWO methods are therefore particularly well adapted to the treatment of organic waste requiring total destruction of their organic matrix.

However, one of the problems faced by users of these technologies is the impossibility to treat effluent containing solid matter in particulate form dispersed in a fluid. These high pressure methods are systematically continuous and, consequently, are limited to liquid, pumpable effluent. However particles having a diameter of more than 7 µm cannot enter high pressure pumps, i.e. whose discharge pressure is greater than 100 bar, the pumps usually used. Oxidation methods in pressurized water are therefore very sensitive to the type of flow to be treated. This prohibits their application as soon as the flow to be treated contains particulate solid matter in suspension.

In addition, these methods require energy consumption to pressurize the fluids to operating pressure. This requirement may be prohibitive for methods using a high flow rate, and generally makes SCWO methods scarcely competitive in terms of operating costs, in the face of competing methods for treating special industrial waste.

The subject-matter of the present invention is precisely an injection device, an injection installation and a pressurized water method for treating waste matter, which overcome these drawbacks. It applies both to WAO methods and to SCWO methods which we shall globally term pressurized water methods. However SCWO methods are the preferred application of the invention. With SCWO operating conditions at high temperatures and high pressures, the implementation of the invention becomes even further advantageous.

These objects are achieved according to the invention by the fact that the device for injecting matter into a reaction vessel comprises a pressurizing capacity having an inner volume in which a mobile assembly is arranged, compartmenting this inner volume sealingly into two variable volumes, namely a matter compressing capacity and a hydraulic pressurizing capacity. The mobile assembly advantageously consists of a bellows or mobile piston.

Through these characteristics, the device for injecting matter in suspension does not use any high pressure dynamic seal at the fluid circulation systems, and in particular on the circuit followed by the waste. Therefore it allows the injection of waste containing matter in suspension up to a pressure of 300 bar. Also, it is robust with respect to leakage risks, unlike commercially available piston pumps.

Advantageously, the device comprises a turbine located at the inlet of the compressing capacity, enabling homogenization of the matter to be treated. The turbine is preferably driven magnetically.

Preferably, the device comprises a device tracking the movement of the mobile assembly. In one embodiment, it comprises a guide tube fixed to a wall of the pressurizing capacity, the axis of this tube being arranged perpendicular to the direction of movement of the mobile assembly, and a guide shaft fixed to the mobile assembly and sliding within the guide tube. The device for tracking the mobile assembly is a magnetic device for example, recopying the position of the guide shaft in the guide tube. It is used to regulate the filling and emptying cycles of the compressing capacity.

The installation for treating waste matter comprises a reaction enclosure having an inlet for the matter to be treated, an inlet for an oxidizing gas mixture, e.g. air compressed to operating pressure, an outlet for a liquid/gas effluent and a device for injecting matter to be treated connected to the inlet for the waste to be treated. This device conforms to the invention, and its variable pressurizing capacity is connected to the effluent outlet of the reaction enclosure.

A liquid/gas separator allows separation of the effluent leaving the reaction enclosure into a liquid phase and a gas phase, the liquid phase being sent to the pressurizing capacity of the injection device.

Therefore the matter to be treated is propelled into the reaction enclosure by isobar hydraulic transmission e.g. via a displacement pump using the aqueous effluent as hydraulic fluid. The power consumption to achieve this movement is minimum compared with the consumption which would be necessary, at an identical flow rate, for pressurizing a fluid from atmospheric pressure to operating pressure.

According to another advantageous characteristic of the invention, the gaseous phase of the effluent derived from the liquid/gas separator is added to a gas turbine. This allows recovery of the pressure energy contained in this gaseous phase. The turbine can be used, for example, to drive the compression unit of the oxidizing gas mixture added to the reaction enclosure.

Best advantage is therefore drawn from the pneumatic power contained in the gaseous effluent under high pressure, and thereby reduces the electric power needed to generate the airflow of the method.

According to another advantageous characteristic of the invention, the installation comprises two devices for injecting matter, operating in phase opposition.

With this arrangement it is possible to eliminate discontinuities in the injection of matter, e.g. waste, into the reaction enclosure. The two injection devices use common elements i.e. the circulation pump for the matter, the displacement pump for circulating the hydraulic fluid and the reaction enclosure.

Advantageously, the matter is solid matter in particulate form, dispersed in a fluid.

According to the pressurized water method for treating matter in an installation of the invention, the compressing capacity is filled with the matter to be treated, pressure is applied, and this matter is injected by placing the pressurizing capacity in communication with the outlet of the gaseous phase of the liquid/gas phase, and respectively with the outlet of the liquid phase of the liquid/gas separator, the injection of matter is continued until the compressing capacity is empty, this capacity compressing the matter to be treated is then depressurized by closing the communication between the pressurizing capacity and the reaction enclosure e.g. by means of a shut-off valve. The same cycle is then resumed, the effect of the filling of the compressing capacity with the matter to be treated being to evacuate the hydraulic pressurizing fluid towards a reservoir.

The matter to be treated is added by means of a high throughput centrifugal pump, e.g. between ten and twenty times the injection rate of the matter to be treated into the reaction chamber. The duration of the cycle is preferably between five and ten minutes in order, in particular, to prevent fatigue of the shut-off members.

Other characteristics and advantages of the invention will become further apparent on reading the following description of an example of embodiment given for illustration purposes, with reference to the single FIGURE.

BRIEF DESCRIPTION OF THE DRAWINGS

The FIGURE depicts the supercritical wet oxidation system including the injection of particulate matter into the system.

An installation is described below, and a supercritical water oxidation method, for treating waste. The reaction takes place in a reaction-enclosure 2. This enclosure is of usual type. For example, it is possible to use an enclosure of elongate cylindrical shape comprising a main tubular body and an inner body arranged inside the main body, as described in French patent FR 2 814.967. The reaction enclosure is not part of the invention. It will not therefore be described in further detail.

Figure 1:
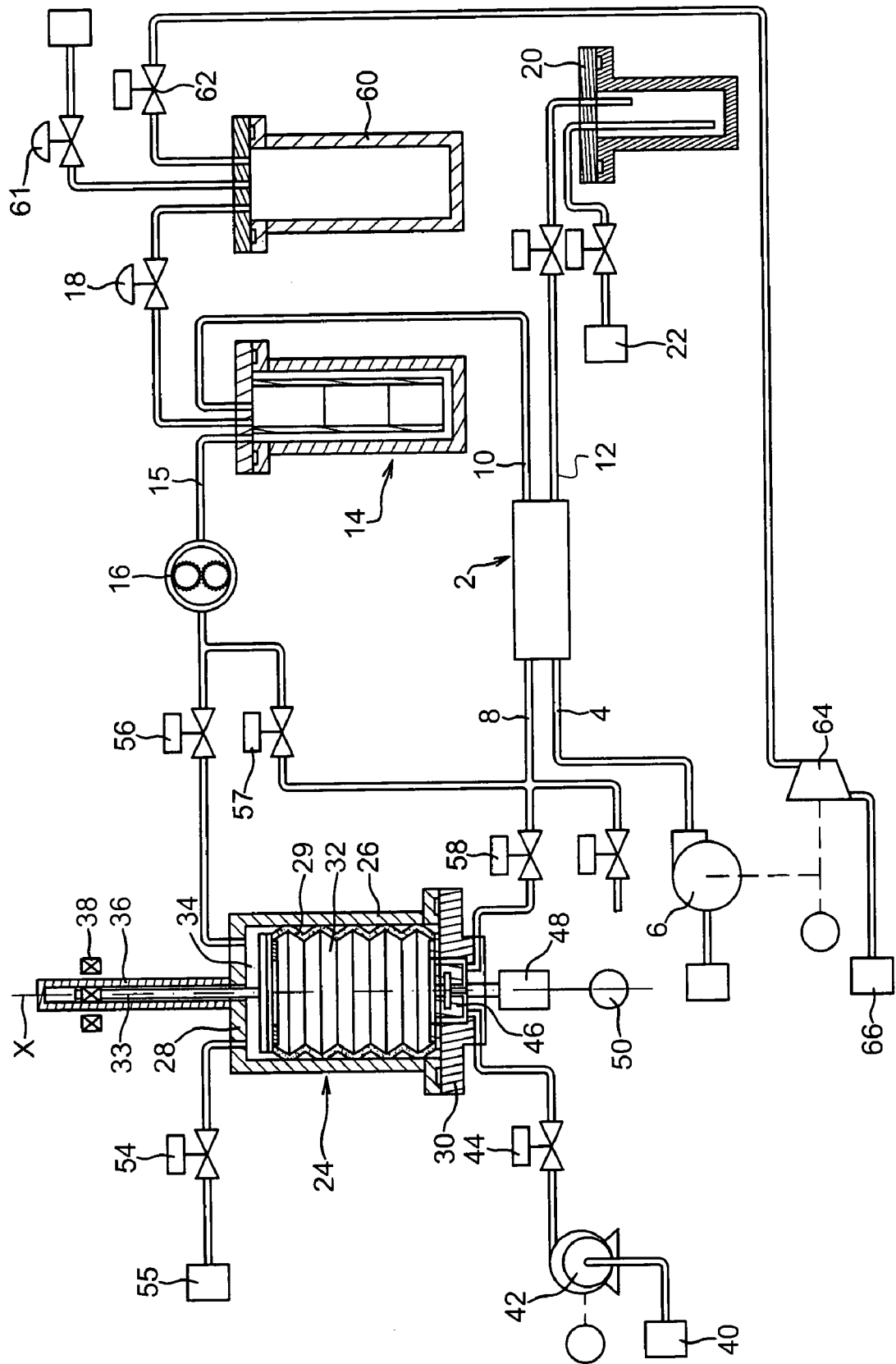

The reaction enclosure 2 is supplied with pressurized air at a nominal flow rate via inlet 4. The air is injected directly into the reaction area by a high pressure compressor 6 from ambient air or from the headspace of a waste storage tank, allowing its possible renewal.

The reaction enclosure is fed with waste under pressure and at nominal flow rate via inlet 8. The gas/water effluent leaves the enclosure via outlet 10 and the brine via outlet 12. This brine contains the most part of the mineral elements of the initial waste. In the reaction enclosure 2, under usual pressurized water operating conditions, it is considered that the waste is converted into $CO_2$, $N_2$ and $H_2O$, and that the flow leaving outlet 10 consists of the cooled mixture of the aqueous and gaseous effluents of the method.

The mixture of aqueous/gaseous effluent leaving enclosure 2 is separated at operating pressure and at operating temperature in the gas/liquid separator 14. The aqueous effluent is removed by the transfer pump 16 which is preferably a displacement pump, e.g. a gear pump. The gaseous effluent is evacuated via the flow control valve 18 or a discharger, thereby regulating the pressure in the reaction area, in the liquid/gas separator 14 and in the equipment connected to this assembly.

The brine removed at outlet 12 at ambient temperature by successive pulses is sent into the buffer capacity 20 before being sent to storage 22.

The injection device 24 which forms one of the essential elements of the present invention, consists of a main body 26 of cylindrical shape with circular section, preferably arranged vertically. The upper part, the body 26, comprises a bottom end 28. Its lower open part is closed by a flange 30.

The inner volume of the main body 26 is compartmented into two variable volumes by a mobile assembly. In the example, the mobile assembly consists of bellows 29 fixed to its lower part on the flange 30. The bellows divide the volume of the inner body of main body 26 into a waste pressurizing capacity 32 and a hydraulic pressurization capacity 34 for this waste. To allow unhindered movement of the bellows the ratio between the height and diameter of the pressurizing capacity must lie between 2 and 5. The movement of the bellows is guided along axis X of capacity 24 by a guide shaft 33 which is secured to the bellows and slides within a guide tube 36. On the guide shaft a magnetic device 38 is attached to recopy the position of this shaft outside the guide tube. It is therefore possible to follow the filling status of the bellows by distance measurement.

The waste is injected at low pressure but at a high flow rate into the waste pressurizing capacity 32 from storage point 40 via a low pressure centrifugal pump 42. The pressurizing capacity 32 and the pump 42 are insulated by a shut-off valve with actuator 44. A turbine 46, placed in rotation by a magnetic driver 50 actuated by an electric motor 50, is mounted on the flange 30. The function of the turbine 46 is to homogenize the waste entering into the pressurizing capacity 32.

When the pressurizing capacity 32 is fully filled, i.e. in deployed position of the bellows 29, the hydraulic pressurizing capacity 34 is placed in communication with the liquid/gas separator 14 and, more particularly with outlet 15 for the liquid phase of the separator 14. This is achieved by closing the shut-off valve 54, allowing evacuation of the aqueous phase towards the storage point 55 and by opening the shut-off valve 56. The hydraulic fluid is injected into the pressurizing capacity 34 by the magnetically driven gear pump 16. This allows high pressure injection of the waste under controlled flow rate from the waste pressurizing capacity 32 towards the inlet 8 of the reaction enclosure 2, this connection being insulated by a shut-off valve with actuator 58. The waste is propelled into the reaction chamber by isobar hydraulic transmission by the displacement pump 16 using the aqueous effluent as hydraulic fluid. The power consumption to achieve this movement is minimum compared with the energy required for pressurizing a fluid from atmospheric pressure to operating pressure at identical flow rate. This functioning is based on the assumption that the flow of water which is injected with the waste into the reaction enclosure 2 is entirely found in the effluent leaving the reactor.

A shut-off valve with actuator 57 enables the displacement pump 16 to re-circulate the aqueous effluent indefinitely towards the inlet 8 of the reaction enclosure 2.

The waste injection device operates in cycles comprising at least:

rapid filling of the waste under low pressure into the capacity 32;

waste pressurization by contacting with the hydraulic fluid by means of the bellows 29;

injection under high pressure and controlled flow rate by the circulation pump 16;

depressurization of the pressurizing capacity 34;

low pressure emptying of the hydraulic fluid in parallel with following filling of the bellows 29 with waste.

So that this functioning does not induce notable disturbed operation of the reaction enclosure, in particular thermal disturbance of the reactor, and to maximize the treatment rate with the equipment used, the operating cycle must have a duration of at least 5 to 10 minutes so as not to lead to accelerated, needless fatigue of equipment, and in particular of the shut-off members. The height of the pressurizing capacity 32 must be sufficient to ensure correct resolution of level measurement 38. It must be at least 5 to 10 cm. Finally, for efficient cut-off of the feed of waste to the reaction enclosure, the ratio between the flow rate of the waste feed pump 42 and the flow rate of the feed by the injection device 24 must be at least 10 to 20 to maximize the ratio between the duration of the waste injection step to the duration of the filling phase. The value of this ratio must be greater than 90-95%.

It is possible to eliminate discontinuities of waste injection into the reaction enclosure 2 by using a second injection device similar to device 24. The two injection devices use common equipment i.e. the waste circulation pump 42, the displacement pump 16 for circulating the hydraulic fluid, and the reaction enclosure 2. One of these devices is filled with waste while the other is in the injection phase. Under these conditions, the duration of the injection phase can be the identical to the duration of the waste filling phase. This makes it possible to achieve continuous waste injection.

The injection device and method just described require little additional energy input, and therefore operating costs are lowered. Also, another advantage of this installation and method is to allow the treatment of matter in suspension in the liquid waste. Particles of diameter larger than 7 µm cannot enter high pressure pumps, i.e. pumps whose discharge pressure exceeds 100 bar. Conventional type pressurized water methods therefore cannot be applied to the treatment of an aqueous phase containing waste in suspension. On the contrary, the device of the invention allows the injection of organic matter containing particles in suspension, under controlled flow rate. These particles may be organic or mineral. The maximum particle size of these particles is limited by the size of the flow diameters of the shut-off valves, branch connections and piping along which the waste travels. Preferably, the maximum size of the particles does not exceed on third of the diameter of the minimum flow passage within the circuits.

With the method of the invention it is also possible to re-use the energy contained in the gaseous effluent leaving the separator 14. The gaseous/aqueous effluent leaving the reaction area is separated under high pressure in the separator 14. It is purged by a controlling valve 18 or discharger to allow adjustment of the pressure of the method to its nominal value, controlled by measurement of the pressure in the piping 10. It is possible to draw benefit from the high pressure gaseous flow directly at the exit of the controlling valve 18. In conventional manner, as illustrated in the figure, the gaseous flow is sent to a buffer capacity 60. A shut-off valve with actuator 62 allows pneumatic supply to the pneumatic motor or the turbine 64 magnetically coupled to the air compression unit 6 of the method. The gas leaving this pneumatic device is evacuated towards to the gas outlet 66. During operation, the electric power supplied to the compressor motor allows maintaining of the required compression rate and completes the pneumatic power output. This device allows best use of the pneumatic power contained in the gaseous effluent under high pressure, and thereby reduces the electric power needed to generate the airflow of the method.

The gaseous effluents under high pressure derived from the controlling valve 18 are collected continuously in the gas buffer capacity 60 whose pressure is controlled by a control valve or a discharger 61. The pressure in the buffer capacity is approximately 10 to 50 bar.

The device just described for the injection of organic matter in suspension in water makes it possible to adapt an injection capacity, not commercially available, to methods on a laboratory or pilot scale. The injection of matter in suspension, under high pressure and at controlled flow rate, is valid for injection flow rates in the order of one hundred kilograms per hour. For lower flow rates, the direct injection of this type of fluid could only be achieved using piston devices of pusher-syringe type whose robustness for long-period use is insufficient. The device of the invention applies to the qualification of small-scale methods, to the development of industrial processes of small size such as those required in the nuclear waste treatment industry or the treatment of organic waste produced in a confined environment of small size such as ships, submarines or space capsules. In particular, it allows the destruction of organic solids using a continuous SCWO method to be considered, not only regarding mineralization properties in supercritical water but also by validating the advantage of coupling the supercritical fluid with a mechanical action, such as achieved by the axial turbine 46. It also applies to the treatment of contaminated ion exchange resins in the industrial areas treating irradiated nuclear fuel and nuclear weapons.

The method and device of the invention also apply to the treatment of sludge from treatment plants or industrial effluent such as those in the pharmaceutical, chemical, petrochemical and agri-food industries, paper mills and farm waste. It can be used to inject effluent containing matter in suspension, up to a pressure of 300 bar and over a broad range of flow rates. In addition, the recovery of mechanical energy reduces the operating costs of the installation but also investment costs, since the main high pressure pump is one the three most costly items in conventional pressurized water methods.

The invention claimed is:

1. Device for injecting organic matter into a reactor having a reaction enclosure for treating the injected organic matter using a supercritical water oxidation method, with the reaction enclosure having an inlet into which the organic matter is injected from said device under pressure and an outlet for generating a liquid/gas phase from the treatment of said organic matter wherein the device comprises a body having an inner volume defining a pressurizing capacity (24) in which a mobile assembly is arranged for dividing the inner volume into two variable volume compartments including an organic matter compressing capacity compartment (32) and a hydraulic pressurizing capacity compartment (34) and with the device being connected to said reactor through a valve assembly for controlling communication between the device and the inlet and outlet of said reaction enclosure such that fluid from the outlet of the reaction enclosure will be fed into the hydraulic pressurizing capacity compartment (34) of the device when communication between the outlet and the device is established via the valve assembly.

2. Device according to claim 1, characterized in that the mobile assembly consists of a bellows (29) or a mobile piston.

3. Device according to claim 1 or 2, further comprising a turbine (46) located at an inlet to the compressing capacity compartment (32) for enabling homogenization of the organic matter when injected into the device.

4. Device according to claim 3, characterized in that the turbine (46) is magnetically driven.

5. Device according to claim 3 further comprising a device (38) for tracking the movement of the mobile assembly.

6. Device according to claim 5, further comprising a guide tube (36) fixed to a wall (28) in the body of the device, and a guide shaft (38) fixed to the mobile assembly sliding within the guide tube (36).

7. Device according to claim 6, characterized in that the device (38) for tracking of the mobile assembly is a magnetic device (38) which detects changes in the position of the guide shaft (33) in the guide tube (36).

8. A system for the treatment of organic matter dispersed in a fluid medium comprising: a reactor having a reaction enclosure (2) including an inlet (8) into which the organic matter dispersed in a fluid medium is injected, another inlet (4) adapted to receive an oxidizing gaseous mixture e.g. air compressed to operating pressure, an outlet (10) for generating a liquid/gas effluent from the treatment of said organic matter, in combination with a device (24) for injecting said organic matter into the inlet (8) of said reaction enclosure, with said device comprising a body having an inner volume forming a pressurizing capacity (24) in which a mobile assembly is arranged for dividing the inner volume into two variable volume compartments including an organic matter compressing capacity compartment (32) and a hydraulic pressurizing capacity compartment (34) and a valve assembly for controlling communication between the device and the outlet of said reaction enclosure such that the fluid effluent is injected into the hydraulic pressurizing capacity compartment of said device when communication with the outlet is established.

9. A system according to claim 8, further comprising a liquid/gas separator (14) connected to the outlet of said reaction enclosure to separate the effluent leaving the reaction enclosure (2) into a liquid phase and a gaseous phase, and being connected to said hydraulic pressurizing capacity compartment (34) of said device through said valve assembly.

10. A system according to claim 9, further comprising a displacement pump (16) for driving the liquid phase from the liquid/gas separator (14) to the hydraulic pressurizing capacity compartment (34) in the device.

11. A system according to any of claims 9 or 10, characterized in that the gaseous phase of the effluent leaving the liquid/gas separator (14) is sent to a turbine or gas motor (64).

12. A system according to claim 11, characterized in that the motor or turbine (64), at least in part, drives a unit (6) for compressing the oxidizing gaseous mixture added to the reaction enclosure (2).

13. A system according to claim 8 wherein said device (24) is a first device with said system further comprising a second device operating in phase opposition to said first device.

14. Device according to claim 1 in which the organic matter is solid matter in particulate form dispersed in a fluid.

15. A supercritical water oxidation method for treating organic matter in a reaction enclosure of a reactor having a first inlet into which the organic matter is injected using the device of claim 1, a second inlet for introducing a pressurized fluid into the enclosure and an outlet for generating a liquid/gas phase effluent from the treatment of said organic matter in the reactor, the method comprising:
    injecting the organic matter under pressure into an inlet of the device of claim 1 until the organic matter compressing capacity compartment (32) is filled;
    using a valve assembly for controlling communication between the device and the inlet and outlet of said reaction enclosure;
    opening communication between the hydraulic pressuring capacity compartment (34) of the device and the outlet (10) of the reaction enclosure to cause effluent fluid from the outlet (10) to flow into the hydraulic pressuring capacity compartment (34) of the device;
    injecting organic matter from the compressing capacity compartment of the device into the inlet of the reaction enclosure until the compressing capacity compartment (32) is empty; and
    shutting off the communication between the hydraulic pressuring capacity compartment of the device and the reaction enclosure to depressurize the hydraulic pressuring capacity compartment (34).

16. Method according to claim 15, in which organic matter is fed into the compressing capacity compartment (32) of the device using high flow rate centrifugal pump (42).

17. Method according to claim 16, characterized in that the flow rate of the centrifugal pump (42) is between 10 and 20 times the injection rate of the organic matter to be treated in the reaction enclosure (2).

18. Method according to claim 15, wherein the method has a cycle time in a range from 5 to 10 minutes.

19. Method according to claim 16 wherein the organic matter contains particles of solid organic matter in suspension and has maximum particle size of approximately one third of the diameter of the minimum passageway used in the high flow rate centrifugal pump (42).

20. Method according to claim 16, wherein the method has a cycle time in a range from 5 to 10 minutes.

21. Method according to claim 17, wherein the method has a cycle time in a range from 5 to 10 minutes.

* * * * *